United States Patent [19]

Romeu

[11] Patent Number: 4,712,282
[45] Date of Patent: Dec. 15, 1987

[54] MACHINE TOOL

[76] Inventor: Ramon Romeu, La Ségarie, Saint-Jean-Lespinasse, 46 400 Saint-Cere, France

[21] Appl. No.: 889,955

[22] Filed: Jul. 28, 1986

[30] Foreign Application Priority Data

Jul. 26, 1985 [FR] France ............................ 85 11457

[51] Int. Cl.⁴ .......................... B23B 7/00; B23C 1/14
[52] U.S. Cl. .................................... 29/27 C; 409/168
[58] Field of Search .................... 29/27 C, 27 R, 568; 269/61; 409/165, 166, 168, 197, 198, 225; 408/45, 46, 50, 71

[56] References Cited

U.S. PATENT DOCUMENTS

| Re. 31,288 | 6/1983 | Matsuzaki et al. | 29/27 C |
|---|---|---|---|
| Re. 31,304 | 7/1983 | Tsukiji | 29/27 C |
| 1,316,221 | 9/1919 | Conradson | 409/168 |
| 1,659,228 | 2/1928 | Williams | 409/168 X |
| 3,228,266 | 1/1966 | Budney et al. | 409/168 |
| 3,700,228 | 10/1972 | Peale | 269/61 |
| 3,998,127 | 12/1976 | Romeu | 409/225 |
| 4,173,817 | 11/1979 | Voglrieder et al. | 29/568 |
| 4,369,958 | 1/1983 | Maynard | 409/168 X |
| 4,401,400 | 8/1983 | Stark | 408/71 |

Primary Examiner—William R. Briggs
Attorney, Agent, or Firm—Larson and Taylor

[57] ABSTRACT

The machine tool comprises, mounted by journals (7,7) between two strong uprights (1,2), a cradle (6) which pivots about a pivot axis and carries a plate (15) which may be driven in rotation, and a general slide (3) mounted on the uprights and supporting a saddle carrying a carriage which is vertically movable and provided with a single tool spindle (13) which is capable of receiving, from a tool changer, either milling or drilling tools, or turning or boring tools, said spindle being thus capable of being moved toward the workpiece to be machined carried by the plate. An exterior power motor (32) drives the plate (15) through a transmission extending through one of the journals of the cradle.

9 Claims, 4 Drawing Figures

MACHINE TOOL

The present invention relates to improvements in the machine tool disclosed in my U.S. patent application Ser. No. 795,360 which concerns a machine tool comprising a cradle pivotable on a frame, a table, for receiving the workpiece to be machined and rotatively mounted on the cradle, and machining means carried by the frame, wherein the cradle is mounted to be movable about the axis of a shaft for pivoting the cradle, the shaft of rotation of the table is fixed in translation relative to the cradle, and the machining means comprise turning, milling, and/or boring tools supported by means of which some are movable in three directions in space so that said tools may be moved toward said table within a wide range of inclination of the cradle about its shaft.

Preferably, the pivot shaft of the cradle is horizontal and the shaft of rotation of the table is concurrent with said horizontal shaft and the pivot shaft of the cradle is disposed above the upper surface of the table receiving the workpiece to be machined.

The machining means are advantageously supported by a general slide which is movable in a plane spaced from the pivot shaft of the cradle and in particular parallel to said shaft, for example in a direction of horizontal displacement.

The general slide is slidable on guideways at the top of two parallel strong uprights which are part of the frame of the table and carry the cradle pivoting shaft.

An object of the invention is to improve the machine tool disclosed in said patent application in a universal, simplified and special embodiment.

Another object of the invention is to permit an easy arrangement of the machine according to said patent application in the form of an extremely powerful machine whereby it is possible to machine workpieces of large size involving very great forces and reactions which in particular arise in the course of turning.

A further object of the invention is to provide a machine tool whereby it is possible, without intervention of man or of an automatic handling installation, to ensure the various desired turning and milling operations, and possibly the drilling operation, on a workpiece, with a maximum degree of occupation of the machine which may thus advantageously replace automatized and so-called flexible workshops in an extremely economical manner.

The present invention provides such a machine tool whereby it is possible to carry out power machining and turning operations, in particular for large workpieces, wherein the pivotable cradle, which is mounted to be pivotable about its horizontal pivot shaft on two strong uprights carrying, at the top thereof, guideways of the general slide, and which is pivotable about its pivot shaft by indexed driving means acting on this shaft, comprises a transmission extending through a pivot journal of the cradle so as to be driven by an exterior power motor which is, for example, fixed relative to the frame, said transmission ensuring the power rotation of the shaft or of the spindle driving the rotatable workpiece-holding table or plate.

Advantageously, the cradle further comprises in its interior a small motor with a transmission and a suitable speed reducer for effecting the angular positioning of the shaft carrying the workpiece-holding tablep in the course of a machining operation in which the workpiece remains stationary on the cradle, such as in particular in milling or drilling operations. Position sensors are associated with the pivot journal of the cradle and the workpiece-holding shaft for obtaining an extremely precise position.

According to an improvement, the machine may comprise, on the general slide, a single spindle unit capable of receiving in succession milling, turning, or boring tools, and possibly drilling tools, said spindle being made to rotate for milling (or drilling) and being immobilized in a desired angular position for turning or boring.

In a preferred embodiment, the machine comprises an automatic tool changer whereby it is possible to place in position on the spindle and to remove therefrom as desired, the milling and turning tools and possibly the drilling or boring tools.

In a more particularly preferred arrangement, the machine according to the invention may comprise automatic feed means for placing in position on an interchangeable table plate, the workpiece to be machined and for removing the workpiece from said plate, while the machine is in process of machining another workpiece. These feed means may advantageously comprise a turntable capable of effecting an angular movement of for example 180° each time, said turntable having at least two stations for receiving workpiece-holding plates, means being provided for transporting a workpiece-holding plate presented by the turntable to the pivotable cradle where it is fixed at the end of the shaft or spindle of the workpiece-holding table for the purpose of being rotated.

It is thus possible to proceed to the removal of a machined workpiece and then to the positioning of a new workpiece to be machined on plates presented by the turntable while another workpiece is in the course of being machined.

Further features and advantages of the invention will be apparent from the following description which is given by way of a non-limiting example with reference to the accompanying drawing, in which.

Figure 1:
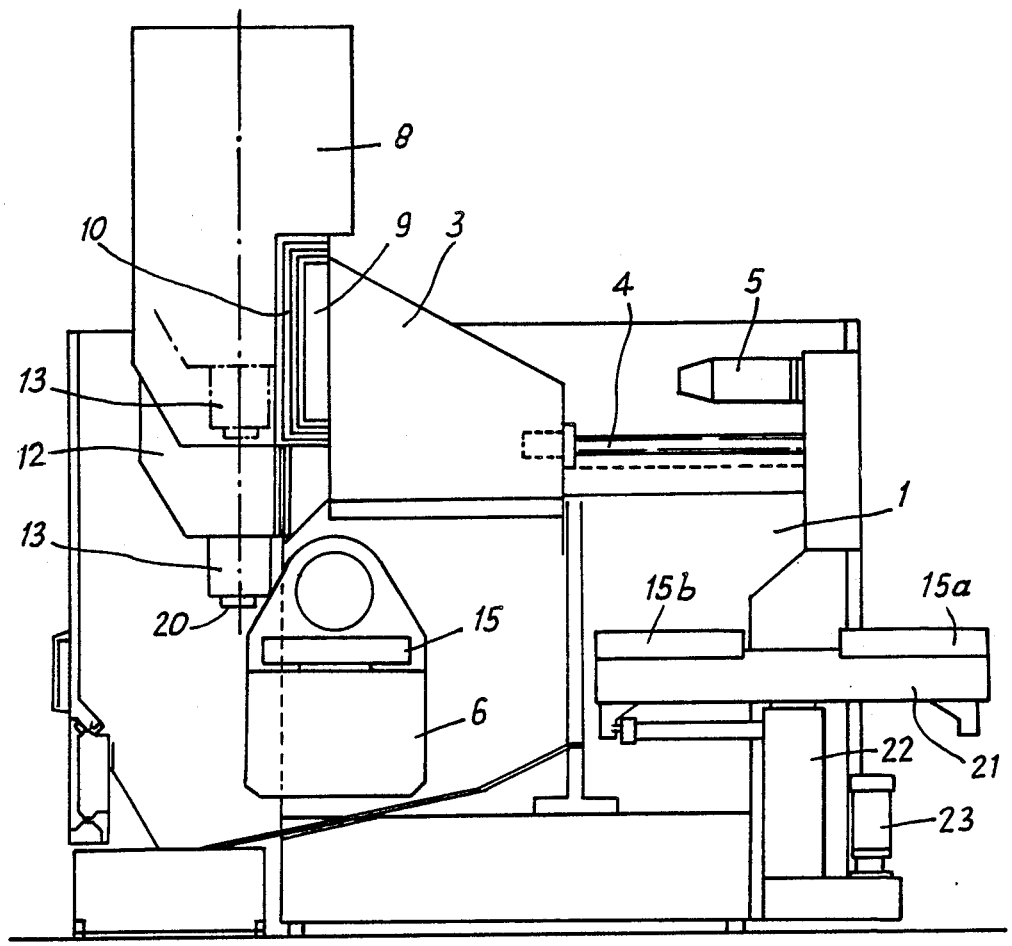
FIG. 1 is a diagrammatic elevational view, partly in section, of a machine according to the invention.
Figure 2:
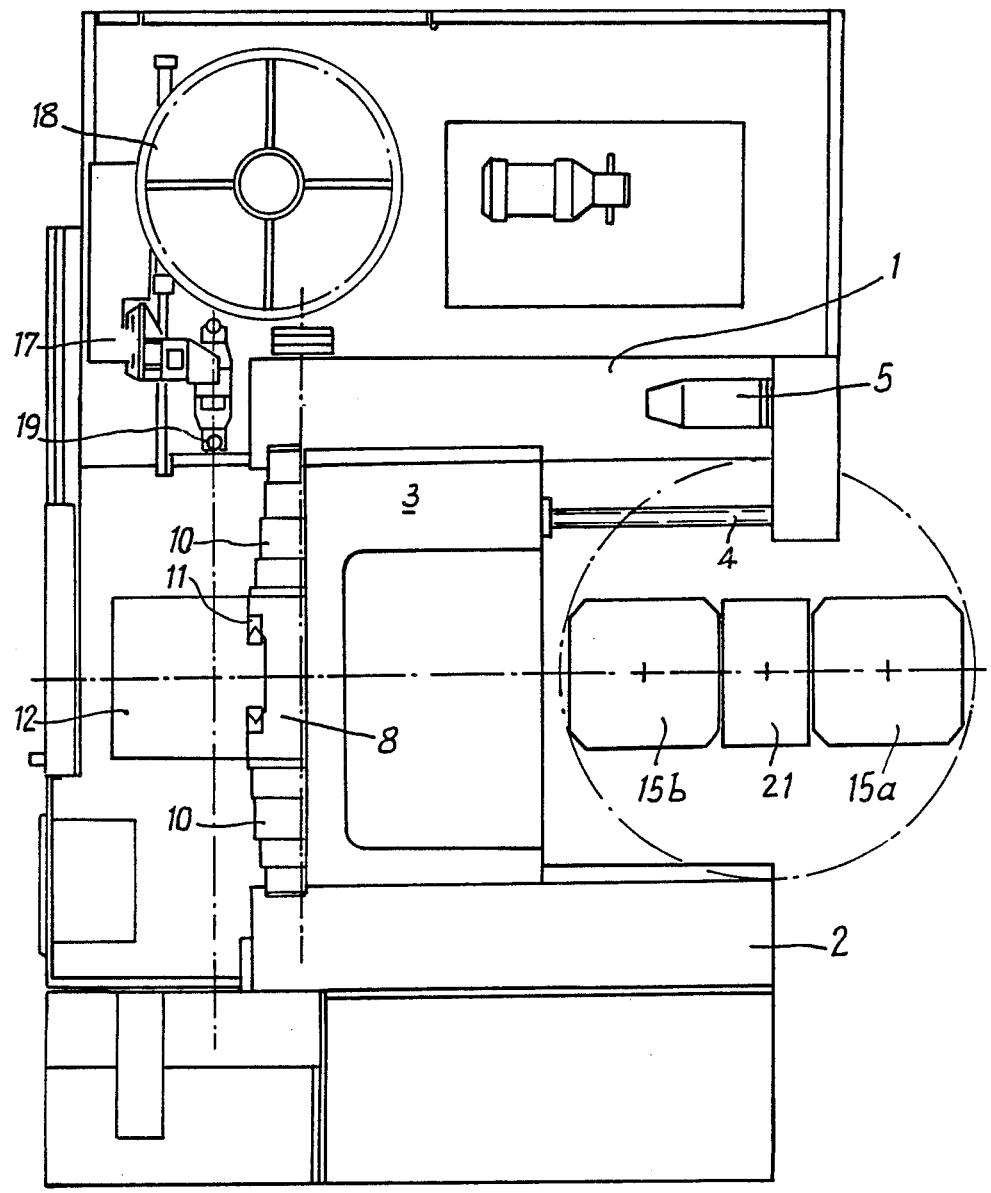
FIG. 2 is a plan view of the machine.
Figure 3:
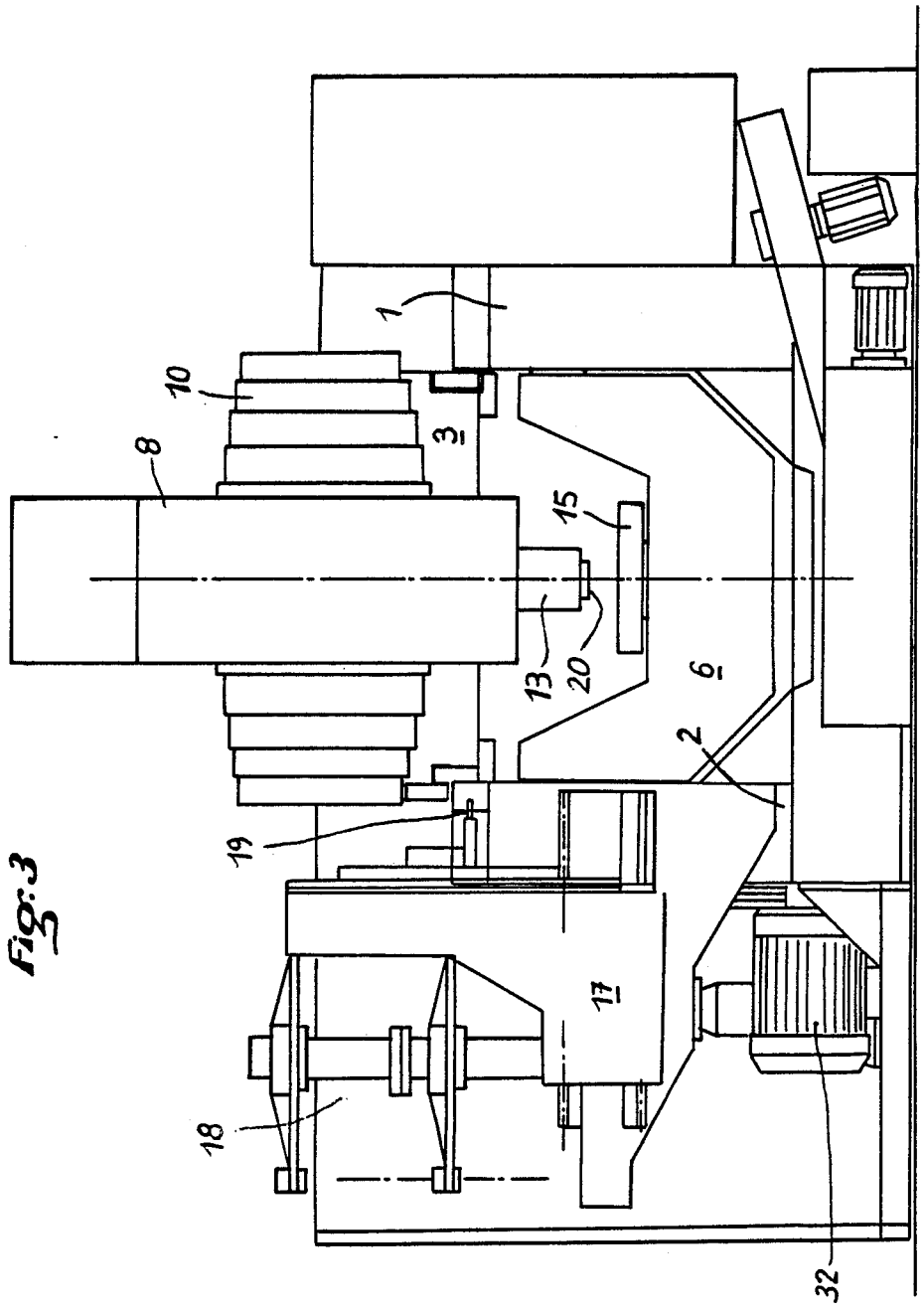
FIG. 3 is an end elevational view of the machine.

Reference will first of all be made to FIGS. 1 to 3.

The illustrated machine tool comprises a frame having mainly two parallel uprights or vertical elements 1,2 each having an upper guideway, the two parallel guideways permitting the sliding of a general slide 3 driven by a screw 4 rotated by a slide-driving motor 5. The pivotable cradle 6 is pivotally mounted by two horizontal journals 7 respectively on bearings carried by the parallel vertical elements or uprights 1,2.

The general slide 3 which slides in the upper part of the machine in the direction of the screw 4, carries a saddle or carriage 8 slidable on a horizontal guideway 9 of the slide 3 in a direction perpendicular to the screw and to the uprights 1,2, this guideway being protected in the conventional manner by a telescopic cover 10. The carriage 8 carries a vertical guideway 11 on which is slidable a carriage 12 carrying a spindle 13 having a vertical axis and capable of being driven in rotation by a powerful motor (not shown) contained in the carriage 12. The spindle may also be immobilized in a desired angular position by conventional spindle-locking means (not shown) also disposed in the carriage 12.

It can therefore be seen that the spindle 13 can occupy any position in the space surrounding the cradle 6.

The latter comprises a turning shaft or spindle 15 which is vertical when the cradle 6 is maintained in its vertical position shown in FIG. 1, the upper end of the spindle 14 being capable of receiving, in the place of a fixed table, a workpiece-holding plate or pallet 15 owing to the provision of rapid fixing means preferably using a locking jack inside the spindle 14, such as the jack 16.

In the illustrated preferred embodiment, it can be seen that the rotary plate 15 which carries the workpiece is disposed at a level lower than that of the horizontal axis of the journals 7 about which the cradle 6 is pivotable.

Placed in the region of the upright 1 is an automatic device for changing tools diagrammatically shown at 17, of conventional type, this device being capable of taking a tool from a rotary magazine 18 and then turning about its axis so as to present the tool in the position 19 in which it can be taken by the tool-holder end part 20 of the spindle 13 which is presented, by combined movements of the carriages 3, 8 and 12, in the correct position for taking hold of the tool 19. The discharge of the tool and the replacement of a new tool are carried out in the same way.

Such tool-changing arrangements are commercially available and therefore need not be described in more detail.

The machine comprises, in its rear part, a rotary turntable 21 mounted on a vertical shaft 22 driven by a motor 23 so as to be capable of turning each time through 180°. The turntable 21 provides two stations on which may be fixed two plates 15a, 15b identical to the plate 15. It can be seen in the FIGS. 1 and 2 that the plate 15a is presented in a position outside the overall contour of the machine, to which position an operator has access for mounting a workpiece to be machined on the plate 15 or releasing an already-machined workpiece and remove it from this plate. It would also be possible to prepare the workpiece on the plate at a distance from the machine tool and to place the workpiece already fixed to a plate each time on the turntable and subsequently remove the machined workpiece with its plate. The rotation of the turntable returns the plate 15a to the position of the plate 15b, the latter again taking up the position of the plate 15a. The plate may then be transferred so as to take the place of the plate 15 on the head of the turning spindle 14. In fact, while a workpiece is being machined on the plate 15, no plate 15b is disposed on the turntable 21; only the plate 15a is outside. The operator mounts a workpiece to be machined on the plate 15a and, when the machining of the workpiece on the plate has finished, the latter is transferred to the position 15b, the turntable 21 is turned, the plate 15a is transferred to the position 15 and the workpiece which has been machined is removed. The transfer is effected by a telescopic arm and a jack (not shown).

Figure 4:
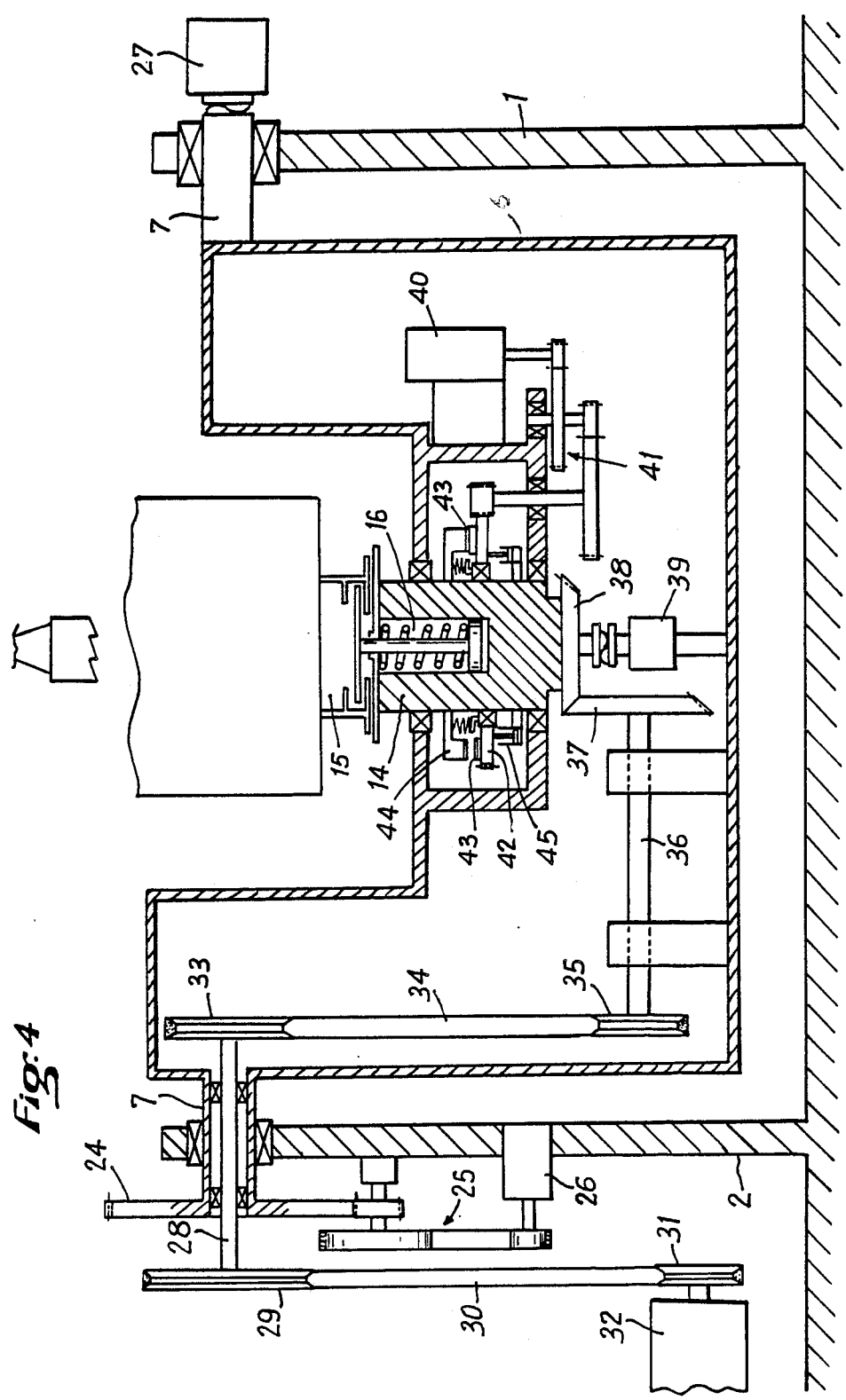
FIG. 4 is a very diagrammatic view of the driving and transmission means of the machine and in particular of the cradle.

With reference more particularly to FIG. 4, the latter shows that the cradle 6, which has diagrammatically a U shape, is pivotally mounted by journals 7 on the upper ends of the branches of the U. The left journal 7, which extends through the bearing carried by the upright 2, has, on the other side of the upright 2, a gear wheel 24 which may be driven, through a transmission 25 formed by various gear pinions, by a motor 26 for driving the journal of the cradle. The other journal 7, which extends through the bearing carried by the upright 1, drives the rotating part of a coder having 360,000 points diagrammatically shown at 27.

Extending through the journal 7 disposed on the upright 2, is a shaft 28 mounted in a bearing or rolling bearing within the journal 7 and carrying, outside, a pulley 29 driven by a power belt 30 extending round the pulley 31 of a power motor 32 for rotating the spindle 14, and consequently the workpiece, for the turning operation.

Inside the cradle 6, the shaft 28 terminates in a pulley 33 which drives, through a belt 34 and a pulley 35, a shaft 36 inside the cradle, the shaft 36 having a bevel gear 37 directly engaged with a bevel gear 38 which is at 90° to the bevel gear 37 and rigid with the lower end of the spindle 14. The lower end of the spindle also drives, through a suitable coupling, a coder 39 having 260,000 points. Thus it will be understood that the motor 32 causes, through this transmission, the rotation of the spindle 14 for the turning operation, the motor 32, which is an extremely heavy power motor, being located outside the cradle 6 without the transmission creating a reaction on the cradle itself.

For operations in which the spindle 14, and consequently the plate 15 and the workpiece it supports, must be in a given fixed angular position, for example for milling or drilling, the cradle further comprises, inside the cradle, a small motor 40 which is connected to a ring gear 42 through a gear speed reducer generally designated by the reference numeral 41, the ring gear 42 being freely rotatively mounted on the spindle 14 by a suitable rolling bearing and a clutch 43 having facing clutch teeth 43 permitting, if it is desired, rigidly connecting the spindle 14, through a ring 44, to the gear 44, the ring 44 being keyed against rotation but free to move in translation on the spindle 14.

In the turning position, the clutch is uncoupled so that the spindle can be rotated at high speed by the motor 32 since it is fully disconnected from the motor 40. On the other hand, when the motor 32 is stopped and it is desired to bring the turning spindle 14 to a given angular position, the clutch is put into its coupling position and the motor 40 can then drive the spindle in rotation to the desired position depending on the indications provided by the coder 39. A jack 45 ensures the coupling and the uncoupling.

The device operates in the following manner:

Assuming that the workpiece is in position on the workpiece-holding plate 15, the slides and the carriages are shifted, under the effect of the numerical control of a conventional computer, so that the spindle or chuck takes a turning tool presented thereto by the distributor 17. When the turning tool is taken hold of by the chuck 20 of the spindle, the carriages are shifted until the tool is presented in a suitable position on the workpiece, the cradle having been, as the case may be, pivoted to the desired angular position by the numerical control.

The motor 32 is then started up and the turning commences, the spindle 13 remaining stationary and the carriages being moved in accordance with the desired turning profile under the effect of the numerical control. At the end of the turning operation, the motor 32 is stopped. If other turning operations are to be carried out, the necessary tool is changed and the turning is continued.

At the end of the turning operations, the spindle 13 is brought by the carriages into the vicinity of the distributor 19 and, after the automatic discharge of the turning tool, a suitable milling tool is automatically placed in position on the end 20 of the spindle 13. The cradle 6 is pivoted about the axis of the journals 7 to the desired angular position, still under the effect of the motor 26 cooperating with the coder 27, the assembly being controlled by numerical control means. Further, these numerical control means put the clutch 43 into its coupling position and cause the motor 40 to rotate until the desired angular position of the spindle 14 has been reached. Meanwhile, the carriages 3, 8 and 12 return the spinle 13 to the desired initial position for milling. The milling can then commence and is pursued, again under the effect of the numerical control. If a plurality of milling operations must be carried out, some or all of the aforementioned steps are repeated. These same steps may be used for drilling.

When the workpiece has been completely machined, the plate 15 with the workpiece is transferred to the turntable, the turntable is made to rotate and a new plate with a blank to be machined is transferred in the opposite direction to the cradle.

It must be understood that the various movements of the various component parts of the machine according to the invention are controlled by numerical control means piloted by a computer in accordance with a suitable program each time adapted to the workpiece to be machined.

What is claimed is:

1. A machine tool comprising a frame having two strong uprights, guideways carried on the uprights, a general slide guidedly engaged in the guideways, a cradle, journals for mounting the cradle on the uprights to pivot about a horizontal first pivot axis, a plate for receiving and holding a workpiece to be machined, a driving shaft carrying the workpiece-holding plate and mounted on the cradle to rotate about a second axis which is fixed in translation relative to the cradle, machining means comprising turning tool means, support means, at least some of which support means are movable in three different directions in space, for supporting the machining means so that the machining means may be moved toward the plate in a wide range of inclinations of the cradle about the pivot axis, indexed driving means drivingly connected to one of the journals of the cradle so as to pivot the cradle about the horizontal pivot axis, a transmission extending through one of the journals of the cradle and drivingly connected to the shaft of the plate, and an exterior fixed power motor fixed relative to said frame and drivingly connected to said transmission for ensuring the power rotation of the driving shaft of the workpiece-holding plate.

2. A machine tool according to claim 1, wherein said transmission comprises, within said journal, a second shaft coaxial with the journal and provided with two pulleys at opposite ends of the second shaft, a third shaft mounted inside the cradle, a belt drivenly engaged with said exterior motor and extending around one of said pulleys, and a second belt extending around the other of said pulleys and drivingly engaging the third shaft, the third shaft being drivingly connected to the shaft of the workpiece-holding plate.

3. A machine tool comprising a frame having two strong uprights, guideways carried on the uprights, a general slide guidedly engaged in the guideways, a cradle, journals for mounting the cradle on the uprights to pivot about a horizontal first pivot axis, a plate for receiving and holding a workpiece to be machined, a driving shaft carrying the workpiece-holding plate and mounted on the cradle to rotate about a second axis which is fixed in translation relative to the cradle, machining means comprising turning tool means, support means, at least some of which support means are movable in three different directions in space, for supporting the machining means so that the machining means may be moved toward the plate in a wide range of inclinations of the cradle about the pivot axis, indexed driving means drivingly connected to one of the journals of the cradle so as to pivot the cradle about the horizontal pivot axis, a transmission extending through one of the journals of the cradle and drivingly connected to the shaft of the plate, and an exterior fixed power motor fixed relative to said frame and drivingly connected to said transmission for ensuring the power rotation of the driving shaft of the workpiece-holding plate, and further comprising a second motor disposed inside the cradle for angularly positioning the driving shaft of the workpiece-holding plate and a clutch for connecting the second motor to said driving shaft.

4. A machine tool according to claim 3, comprising second transmission means, a ring mounted to be freely rotatable about the shaft of the workpiece-holding plate, the second transmission means drivingly connecting the second motor to the ring, a second ring keyed against rotation on said shaft, and a clutch cooperative with the first ring and second ring, the second ring being axially movable for coupling and uncoupling the clutch.

5. A machine tool according to claim 1, comprising an automatic tool changer whereby it is possible to place in position on the spindle and to remove from the spindle at will the milling and turning tools and optionally the drilling or boring tool.

6. A machine tool according to claim 5, wherein said automatic tool changer is disposed in the region of one of the uprights of the frame.

7. A machine tool according to claim 1, comprising automatic feed means comprising an interchangeable plate for selectively automatically placing in position on the interchangeable plate the workpiece to be machined and removing the workpiece from the plate while the machine tool is in process of machining another workpiece.

8. A machine tool according to claim 7, wherein said automatic feed means comprise a turntable.

9. A machine tool according to claim 1, wherein the workpiece-holding plate is disposed below the pivot axis of the cradle when the cradle is in a vertical position.

* * * * *